No. 894,251. PATENTED JULY 28, 1908.
C. S. BATDORF.
TRANSMISSION MECHANISM.
APPLICATION FILED MAR. 16, 1905. RENEWED JUNE 11, 1908.

Witnesses:
F. E. Maynard
Fred W. Barnacle

Inventor:
Charles S. Batdorf,
By his Attorney
F. H. Richards.

UNITED STATES PATENT OFFICE.

CHARLES S. BATDORF, OF BROOKLYN, NEW YORK, ASSIGNOR TO FRANCIS H. RICHARDS, OF HARTFORD, CONNECTICUT.

TRANSMISSION MECHANISM.

No. 894,251.   Specification of Letters Patent.   Patented July 28, 1908.

Application filed March 16, 1905, Serial No. 250,441. Renewed June 11, 1908. Serial No. 437,975.

*To all whom it may concern:*

Be it known that I, CHARLES S. BATDORF, a citizen of the United States, residing in Brooklyn, in the county of Kings and State of New York, have invented certain new and useful Improvements in Transmission Mechanism, of which the following is a specification.

The invention has reference to the art of transmission, and is directed more particularly to a class of transmission mechanisms which are adapted to be used in connection with that variety of vehicles, whether for road or for rail, which are automatically propelled; and the invention comprehends such an organization of mechanisms as will not only give a maximum amount of efficiency and power, but which will consume a minimum amount of space and offer a minimum amount of weight.

The invention comprehends the attainment of practical results in the individual mechanisms which are correlated and dependent one upon the other to complete a transmission-train, and also in said train, and while such invention may be embodied into any suitable form for various transmissional purposes, the same is more especially directed to the art of car and automobile propulsion.

It is a design of the invention to provide a power-transmission-motor, and a power-generating and regulating mechanism for the same; to connect such power - generating mechanism to a prime - motor or engine through a train of shafting which may be flexible; to so construct the regulating-means of a power-generating mechanism that it may be capable of varying the quantity of the power and thereby the speed of the transmission-motor from the maximum to the minimum, or vice-versa, while maintaining a uniform velocity of a prime-motor; and to increase the quantity of the power directed to a transmission-motor without material shock during such increasing operation.

It is also a design of the invention to carry the elements of the power-generating and regulating mechanism, and the elements of the transmission-motor within a casing which is divided into a series of intercommunicating compartments, whereby the force of a medium may be directly transferred or switched from a compartment containing the power-generating mechanism, to the compartments containing the elements of a transmission-motor without material loss of the efficiency of the force of said medium, which loss would be due to frictional resistance during the travel of the medium. By so organizing a power-transmission-motor and a power-generating-mechanism therefor, said power-generating-mechanism, and said power transmission-motor will be so intimately associated, that the medium will not be compelled to pass through lengthy or diverted avenues, it being an important design of the invention to switch or transfer the medium (which may be flexible) from a compartment containing a power-generating mechanism through a direct path to a working element of a power-transmission-motor, so that it may act with hydraulic force directly upon said element, (said element being so located in proximity with a power-generating mechanism as to avoid positively all unnecessary ducts, pipes or passages,) and to also transfer or switch the force of the medium in an instantaneous manner to compartments containing some elements of a transmission-motor, by causing the medium to pass through openings formed in the walls which separate the compartments. In this way, substantially the full force of power can be utilized, thereby gaining and maintaining a high degree of efficiency and a minimum amount of medium friction.

It is a further design of the invention to provide means with which a power-generating mechanism may combine, for accumulating and storing up energy until such accumulated energy is sufficient to overcome any temporary resistance to which the elements of a power transmission-motor may be subjected, and as a matter of safety, to protect the casing, there may be added an automatic-valve which will open under predetermined pressure to allow the medium to escape from the pressure chamber and return to the power-generating-mechanism.

It is a further design of the invention to impart a force generated by a power-generating-mechanism to a working element of a power-transmission-motor in a positively direct path, whereby to gain a hydraulic force directly upon an element of a power-transmission-motor and that by precipitating the medium, by gravity, the weight inherent in the medium may be sufficient to substantially overcome frictional resistance between the medium and the casing, and further, that the medium shall, on being exhausted, be returned substantially without friction for regeneration into power.

It is also a design of the invention to provide in connection with a power-generating mechanism, a mechanism comprehending means whereby the quantity of medium flowing to the power-transmission-motor may be regulated or varied at will. The power-generating-mechanism will be continuously operated at a uniform velocity and relatively to the velocity of the prime-motor. Thus, when the power-generating-mechanism is imparting a minimum amount of medium to the transmission-motor through the regulating means, there is also imparted a maximum leverage, which is gained by the accumulated impulses of the power-generating-mechanism, and as the quantity of the medium imparted to the transmission-motor is increased the leverage of the power due to decreased impulses, is proportionally decreased, therefore, in climbing a grade, starting a load or overcoming resistances to which the vehicle may be subjected, the regulating means may be so set as to offer such a quantity of medium to the power-transmission-motor that the maximum efficiency and leverage of the prime-motor may always be used in overcoming such resistance.

It is a further design of the invention to provide means for regulating the passage of the power or medium, and which will be so constructed as to effectually protect those portions of the power generating mechanism which are not in communication with the pressure-chamber from the pressure in that chamber, thereby reducing the friction of the operation of the power-generating mechanism to a minimum, and whereby only that portion of such mechanism, which is in communication with the pressure-chamber, will be subjected to back pressure from that chamber.

It is also a design that there should be arranged with, or operatively connected to the power-transmission-motor, a mechanism effective for causing the forward and backward movements of a vehicle, during the continuous and fixed rotation of the power-transmission-motor, and also for allowing said transmission-motor to run idly, at will, relatively to the running gear.

It is a further design of the invention to drive the prime-motor, the power-generating-mechanism, and the power-transmission-motor constantly in a fixed direction, regardless of the direction of motion of the vehicle, and to maintain the velocities of the prime-motor and the power-generating-mechanism in unison, while the power-transmission-mechanism may operate at variable velocities relatively to the velocity of the prime-motor and power-generating-mechanism or may be maintained idle at the will of the operator.

It will probably be found in practice desirable and advantageous to locate the power-transmission-motor somewhat remote from the prime-motor, or engine; to connect them through a train of shafting, and to preferably situate said power-transmission-motor in close proximity to an axle, for instance, a rear axle of a vehicle, while said prime-motor, may be carried in close relation to another axle, for instance, a front axle, and it may be also found important, in practice, to utilize one of the axles as a part of the power-transmission-motor; by such an arrangement, it will be seen that the vibrations which are due to relating transmission-motors and engines remotely from the shafts, will be avoided.

The power-transmission-motor may be so related to an axle, and that axle be so constructed, as to render additional differential mechanism unnecessary, this being an important feature of the invention.

The principles of this invention may be embodied in any suitable form of mechanism, which will be operated in a suitable manner, and the accompanying sheets of drawings show an embodiment of the invention associated with the running gear of an automobile.

In the several illustrations, similar characters of reference apply to similar parts.

While, as has been stated, the invention is applicable to various classes of mechanically propelled vehicles, and will be associated therewith in a suitable manner; the illustrations accompanying this specification show an embodiment of the invention applied to a rear axle of a running gear of an automobile.

The power-transmission-motor, which will probably be employed in connection with this transmission-train, may be similar to that disclosed in my pending application filed February 9th, 1905, Serial No. 244,931, which has matured into United States Letters Patent No. 849,099, April 2, 1907. However, such a motor need not necessarily be selected for this work, as this invention relates, among other things, to the correlation of a uniformly-driven-prime-motor, having a uniform speed, and a transmission-motor whose power is derived from a power-generating mechanism associated with such prime-motor, and which is driven at a uniform speed, and the subjecting of the power-transmission-motor to a variety of speeds, irrespective of the speed of the prime-motor, and therefore, in carrying out this invention the selection of any particular style of mechanism, is not a matter of importance.

In carrying out this invention, it may be found expedient in practice to employ the transmission-train in multiple so far as it relates to the power-transmission-motor, it being understood, however, that such motors may receive their power through a power-generating mechanism common to all the motors.

The power-transmission-motors, and the power-generating mechanism, as well as power-regulating means, are designed to be embodied in a casing 13, consisting of an upper body portion 213, end members therefor 214, a lower body portion 215 with end caps 216; and which may be divided into a series of compartments, 14, 15 and 16, respectively, which may intercommunicate one with another through openings 17 and 18 respectively, which form ports for the transfer of a medium from one compartment to the others, and the latter compartments may also be provided with ports 19 and 20, connecting with an exhaust 21, which is directed back into one of the compartments, as for instance, the compartment 14, through channel 23.

The compartments 15 and 16, in the present instance, may be duplicated on either side of the casing 13, being separated by the exhaust chamber 21, and each compartment may be provided with a circumferential path 25, about which may travel actuators 26 and 27, these actuators, in the present instance, being mounted for movement upon axes concentric with said path 25, of the compartments 15 and 16. The direction of travel of these actuators will be opposed, and therefore, as will appear later, these actuators may be so indirectly connected with the running-gear of the vehicle, and such mechanism may be employed as to impart the two reverse movements of the actuators to the vehicle.

The actuators 27 in the compartments 16, will preferably be associated with a rear axle 28 of a vehicle, and such axle, in the present instance, may be divided preferably intermediate of the wheels 29 and 30, into two portions 31 and 32, and these portions may be carried in bearings 33 and 34, which may be supported by portions 35, and 36 of the frame work of the vehicle. Thus, it will be seen, that when the transmission-train is in operation, and especially when the vehicle is traveling around a curve, each wheel 29 and 30, as well as each of the power-transmission-motors may operate at independent and varied velocities, whereby to render unnecessary the use of differential mechanism.

The actuators 26, operating in the compartments 15, may be carried by shafts 37, which may be mounted in suitable bearings 38 and 39, which may be supported, in the present instance, by the casing. To the portion 31 of the shaft 28, and the shaft 37, respectively, which extend from beyond the casing 13, may be connected elements of a suitable train of mechanism by which the power of the transmitting-motor may be translated, and by which the aforesaid actuators may receive a simultaneous and alternate motion through similar but independent and opposed paths. One of such trains embodies gears 40 and 41, respectively, associated with said shafts, and which are intermeshed for relatively reversed movement, whereby a uniform motion of the actuators may be had, and they will also travel through substantially similar paths, but in opposite directions as indicated, for instance, as seen by the arrows 42 and 43—the movement of said actuators, however, being in unison. Each actuator will, during its travel in its path, give similar results, but the results of one actuator will alternate with the results of the other actuator, and in this way a desired movement is given to a working member, designated in a general way by 44, which is constantly in intimate contact with the actuators 26 and 27, and which may be termed a balance-valve for regulating the flow of a medium from the compartment 14, containing the power-generating mechanism, to the compartments 15 and 16 containing the actuators, in an intermittently and alternate manner, whereby to govern the motion of said actuators. One of the notable characteristics to be mentioned in connection with an arrangement of this character, is that during the travel of each actuator, their weight will be so equalized that they will be free from resistance other than normal resistance due to frictional contact of the actuators 26 and 27 with the member 44, and the actuators 26 and 27 with their paths 25.

The member 44, may of course, within the purview of this invention, be of any suitable construction, and according to the manner of operation of the actuators, such member 44, may also likewise be mounted for operation. As adaptable to the present arrangement, as shown, therefor, said member 44 may comprehend a body-portion, and an extended member 45, which may be supported in connection with a suitable bearing 46, such, for instance, as by mounting the same upon a pivot 47, although such a construction is not essential. The extremities 48 and 49 together with a considerable length of the body of the same, will move, during a suitable period, in the openings in the dividing walls, which form the ports 17 and 18; the opening and closing of the ports in the present instance, and as will be understood from the illustrations being intermittently effected— the extremities 48 and 49 contacting with abutments 50 and 51 on the interior wall of the casing.

It will be seen that the member 44 will operate in the lower portion of the compartment 14, which will be a chest into which the power generated may flow, and therefore such member 44 will be the instrumentality by which the power will be intermittently admitted to, and cut off from the compartments 15 and 16 during the operation of this member. Attention is drawn to the fact that notwithstanding that this member 44 is under pressure when the medium is admitted to the chambers 15 and 16, as seen by the arrow 52, Fig. 4, there will be substantially no resistance or friction between said member and the medium, which is a desideratum, and the only friction to which this member can be subjected being that of frictional contact between it and its bearing and the actuators, it being understood in this connection, that the extremities 48 and 49 will be in constant contact with the peripheries 53 and 54 of the actuators 26 and 27.

It will be noted that the actuators may be so mounted relatively to each other that they will move in diametrically opposite paths, whereby the throw of each will be equalized and therefore it will not be incumbent upon one to take up the load or burden of weight of the other.

The actuators 27, in the present instance, may be carried by shafts 55, which are mounted in bearings 56, carried by the casing, and each shaft, at that portion thereof, which extends toward the portions 31 and 32 of the axle 28, may be provided with a clutch-face 58, which may register or coöperate with a corresponding clutch-face 59, which may be located on the hub 60 of the gears 40 whereby the gears 40 and shafts 55 may have a relative movement, to and from each other to prevent the end thrust of the shafts 31 and 32 from jamming the actuators against the sides of the compartments in which such actuators operate, the end thrust being lost in the clutches.

The gears 40, hereinbefore mentioned, may be loosely mounted upon the axles 31 and 32, and fixed against longitudinal movement by shoulders 61 and collars 62, carried by the shafts, said shoulder, in the present instance, occupying a recess 63, in the hub 60, may bear against a face of said hub. The gears 40 may be provided with laterally extended flanges 64, having an inner inclined face 65, adapted to mate with an outer incline face 66, of a shiftable clutch member 67, which may be splined as at 68, to the portions 31 and 32 of the axle, and which is shiftable relatively to and from the gear 40 in a manner which will be later explained. Also carried by the portions 31 and 32 of the axle 28, are translating devices 69, such as sprocket wheels, which are loosely mounted, and which may be held in place by collars 70 and 71, which may be held to the axle in any suitable manner, as for instance by set screws. These translating devices may also be provided with laterally extended flanges 74, which are disposed oppositely to the flanges 64, and each flange is likewise provided with an internal clutch face 75, adapted to mate with a clutch face 76 carried by the clutch member 67.

Loosely carried by the shafts 37 are additional translating devices, which may be in the form of sprocket wheels 77, one of the hubs 78, of each of which may be provided with clutch members 79, adapted to engage with clutch members 80, which may be carried by a shiftable clutch device 81 mounted, in the present instance, on said shaft 37, and which is provided with a clutch-face 82 adapted to engage with a laterally extended flange 83, carried by the gears 41, mounted relatively to the shaft 37, for instance, in a manner similar to the mounting of the gears 40 of the shaft 31.

Figures 2, 11:
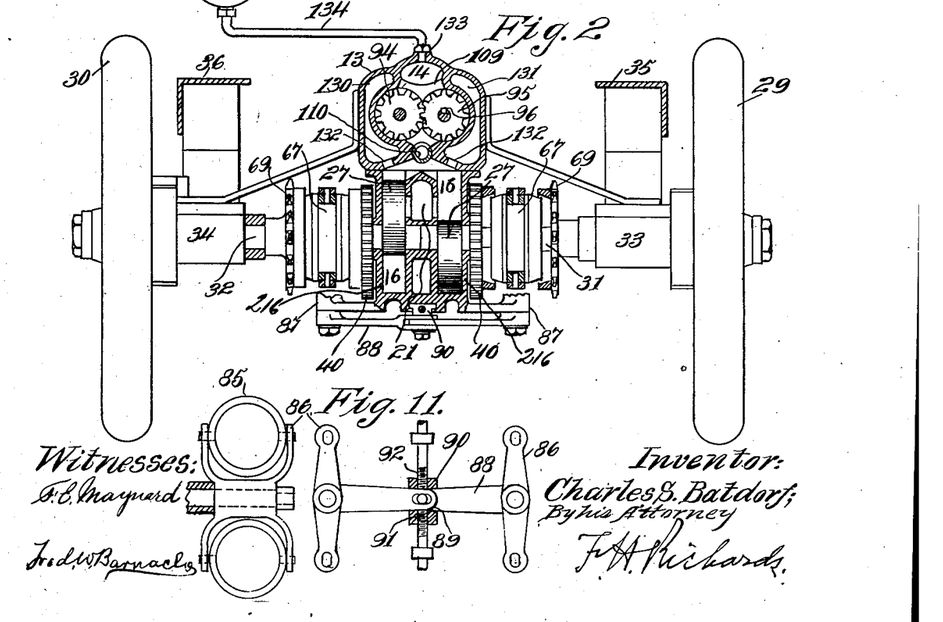
Fig. 2 illustrates an elevational view of the same, partly in section, prime-motor omitted.
Fig. 11 illustrates two views of mechanism operatively connected to the clutch mechanism.

The clutch devices 67 and 81 respectively, may each be provided with a peripheral bifurcation 84, into which may take rings 85 of levers 86, which may be fulcrumed upon a bearing 87 substantially intermediate of the clutch devices 67 and 81, and each of these levers may be provided with an arm 88, whose extremities 89 may connect with a slide 90, which in the present instance, may be provided with a right or left screw threaded bore 91, adapted to take a right or left screw threaded member 92, as seen for instance, in Fig. 11, and this screw-threaded element may be operated in any suitable manner.

Figure 1:
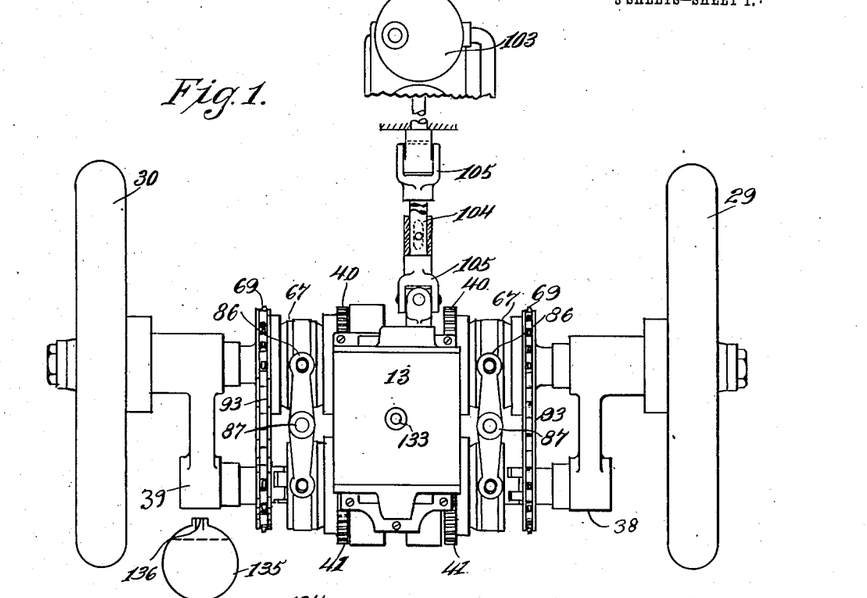
Figure 1 on said drawings illustrates a top plan view of the rear portion of a vehicle running gear, with an embodiment of the invention thereto applied, together with a prime-motor.

It will now be seen that when the power transmission-motor is in operation, and the actuators 26 and 27 are running in opposite directions, the gears 40 and 41 will also operate in opposed directions, and therefore when the lever 86 is actuated to throw the clutches 67 to the left (see Fig. 5) and into engagement with the flanges 64 and the gears 40, the portions 31 and 32 of the shaft 28 will be forwardly rotated, in unison with one set of actuators of the power-transmitting-motor, and this will be accomplished by operating the screw 92 in one direction. When it is desired to reverse the travel of the vehicle, the screw is operated in another direction, and the clutch members 67 are withdrawn from their seats carried by gears 40, and engage with the faces 75 of the flanges 74, of translating device 69, and the clutches 81 will also engage with the flanges 83 of the gears 41 when the motion of the actuators 26, which is opposed to that of the motion of the actuators 27 will be translated through the translating device 77, and sprocket chain 93 to the translating device 69, whereupon said shaft 28 will be turned in an opposite direction, corresponding to the motion of the actuators 26. When the levers 86 are maintained in a position shown in Figs. 1, 2 and 11, the transmission-motor may run idly and independent of the axle 28.

While the medium to be imparted to the actuators 26 and 27 and the member 44, may be of any suitable fluid, and may be imparted thereto in any suitable manner, there is provided, in the present instance, within the compartment 14, a power-generating mechanism which may comprehend a pair of rotatably-mounted elongated gears 94 and 95, one of which in the present instance, may be mounted upon a shaft 96, and fixed for instance by being keyed as at 97 thereto, and the other being loosely mounted on a shaft 98, and both of these shafts are supported in suitable bearings 99, 100, 101 and 102. One of these shafts may be operated from any suitable source of power, such as a prime-motor, designated in a general way by 103, by a preferably flexible and sliding connecting rod 104, and universal joints 105. These gears are divided into a series of stages 106, which are divided or separated by disks 107 staged between webs 109 of the casing, so as to form independent chambers or cells 108. Thus it will be seen that each portion of the power generating gears may generate power independent of the contiguously associated portion.

Between the member 44 and the elements 95 and 96 of the power-generating mechanism, may be located means for regulating the flow of the medium to that portion of the chamber 14, wherein operates the member 44, and while this means may be of any suitable character, the same is here illustrated as comprising an elongated tubular valve 110, which may be provided with an opening which registers with the cells 108, in which the stages or working portions of the power-generating mechanism are mounted, and this element 110 is adapted to be located in a seat 111, and to be moved to and fro therein and into an extension 112 carried by the casing 13, and the movement of this valve may be effected in any suitable manner as, for instance, by a rack 113, which is adapted to engage with a suitable pinion, not shown. This rack, in the present instance, is connected with the valve 110 through a rod 114, which passes through a bearing 115, and which may be provided with a suitable packing 116, which is held in place by a gland 117.

The bore 118, of the valve 110, communicates through a mouth 119, with one of the channels as 22, when the valve is in its initial position, and is also situated in such an initial position, as to leave a free passage 120 between the end 121 of said valve and an inner abutment 122 of the casing 13. This valve 110 may be provided with means to prevent the rupture of the casing due to the temporary obstruction of the delivery of the pump while the end of the valve is moved along in its path from stage to stage and this means also prevents the pressure in the live chambers of the casing from escaping into those chambers or stages of the pump in which pressure is not being generated owing to the fact that the fluid therein is simply being displaced by the movement of the pump elements. This means, in the present instance, may comprehend a secondary valve comprehending a valve seat 123 against which is seated a puppet valve 124 normally held in place by a spring 125, which surrounds a stem 126, suitably journaled in a bearing 127. As this seat 123 is contiguous to the mouths of the cells 108, it will be seen that as the valve 110 is moved in the direction of the arrow 129 from cell to cell, the pressure in the cells 108 may open the puppet valve so as to allow the pressure from that chamber to be forced through into that portion of the compartment 14 which contains the working element 44, but will be automatically instrumental in preventing back pressure from beneath the valve as it attempts to release itself back against the pressure coming from the power generating mechanism.

The casing 13, in the present instance, may be provided in the compartment 14, with pressure chambers 130 and 131, adapted to contain an elastic fluid, such for instance, as air, and these communicate with the lower portion of the compartment 14, by ports 132, so that when the pressure or the force of the medium is being directed against the element 44, and the resistance of the load or the resistance due to climbing a grade is too great to allow the member 44 and the actuators 26 and 27 to operate, the medium which is being continually imparted to the working elements of the transmission-motor, by the multiplied impulses of the power-generating mechanism, will back up through the ports 132 and accumulate in force by combining with and increasing the pressure of the elastic fluid, and therefore at each impulse of the power-generating mechanism, the force of the medium will be correspondingly increased. At the same point of the chamber 14, is provided a pipe connection 133, and a pipe 134, leading from a suitable reservoir 135, such means, at all times keeping the chambers filled with the medium, preventing churning by the gears or power-generating mechanism, and to supply the upper chambers with medium when some portion of the same is, by pressure, forced up into the air chambers and preventing the forming of a vacuum. The reservoir is provided with suitable air-vents, as 136 to permit a free action of the medium contained.

Figures 3, 6, 7, 8, 9, 10:
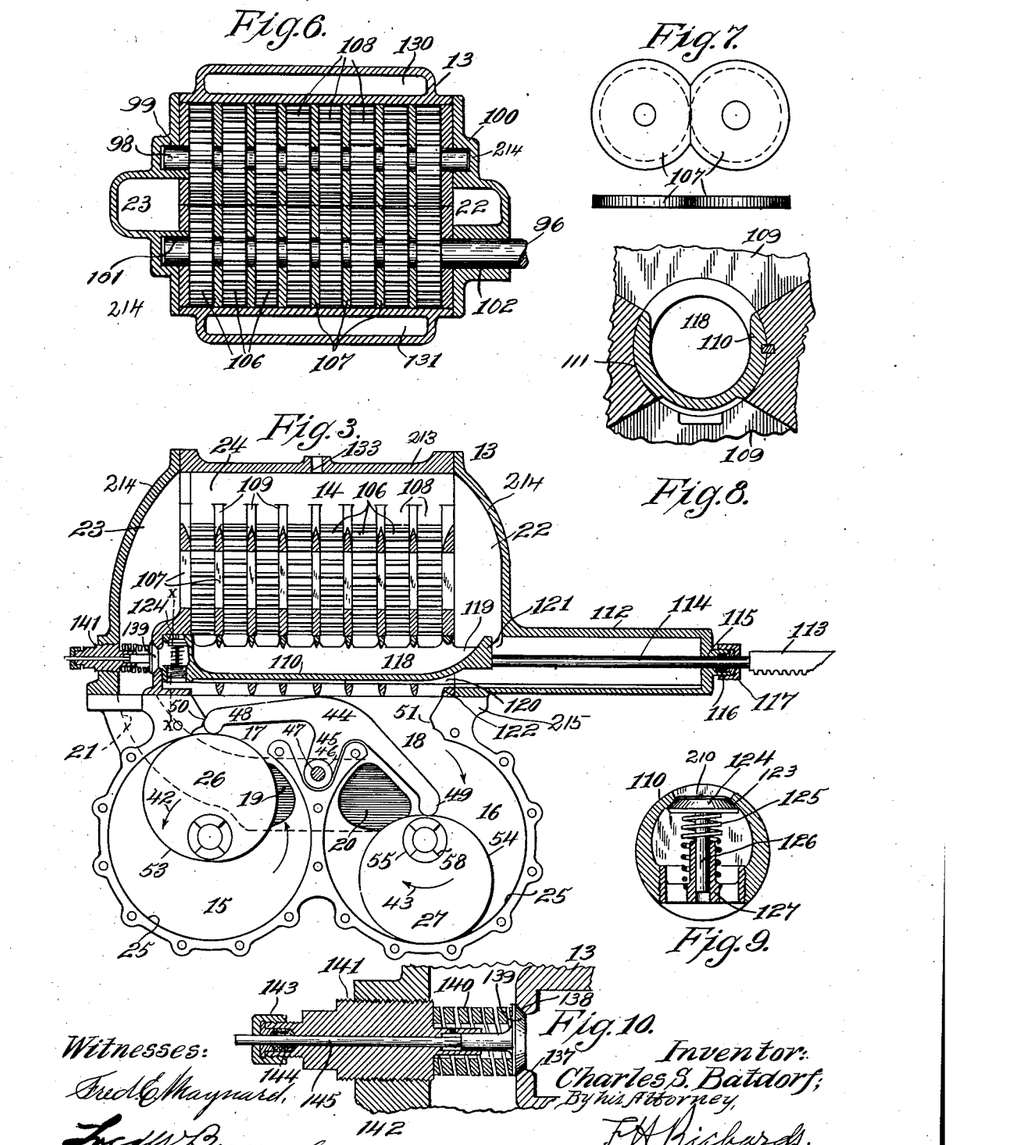
Fig. 3 illustrates a sectional view on an enlarged scale, of a power-transmission-motor, together with power-regulating means, and a power-generating-mechanism.
Fig. 6 illustrates a top plan section of the power-generating mechanism.
Fig. 7, illustrates a detail of the power-generating mechanism.
Fig. 8 illustrates a sectional view of a portion of the power-regulating mechanism.
Fig. 9 illustrates a sectional view, taken on line $x\ x$ of Fig. 4.
Fig. 10 illustrates an enlarged detail view of a form of relief valve shown on Fig. 3.

When the pressure of the medium, plus the pressure of the elastic fluid reaches a predetermined pressure, relative to the capacity of the casing, the excessive pressure may be automatically relieved through a port 137, comprehending a seat 138, against which may be disposed a valve 139, which may be held against such seat 138 by a spring 140, which is held in place, in the present instance, by a plug 141, which may be screw-threaded into a bearing 142, and which plug may be provided with a gland 143 for holding a packing 144 for a stem 145, which is connected to the valve head 139, and adapted to pass through the plug 141, and the gland so that its operation may be noticed, and if desired, the stem may be united with a suitable means, not shown, for visually indicating the operation of this valve. Thus it will be seen that when the valve 110 is opened, and when the elements of the power-generating mechanism force pressure against the member 44, and that pressure fails to operate the member 44, and reaches a point too high for the capacity of the casing, the valve 139 will automatically operate to allow the medium to escape and short circuit through the channel 23, as seen in Fig. 3.

It will now be seen that there is a power-generating-mechanism which, in the present instance, is situated above the power-transmission-motor, and is effective for not only generating a high degree of force, but for imparting that force through a direct and undiverted path to a member acting in true balance as a valve for a plurality of independently operable actuators whereby that force will operate with hydraulic force upon said member, and that regulating means is provided intermediate of the balance valve and the members of the power-generating mechanism, whereby the force generated may be imparted to the balance member in greater or less quantities whereby to vary the speed of the power-transmission-motor and thereby the speed of the vehicle. It will also be seen that the maximum force capable of being generated by the power-generating mechanism *per se*, may be combined with the elastic fluid in the elastic fluid chambers for accumulating and storing up sufficient energy to overcome any temporary resistances to which the power-transmission-motor and vehicle may be subjected. Hence, when the prime-motor or engine is operating at will, and at a uniform velocity,—such velocity being maintained by suitable governing means, and the power-generating mechanism is also operating at a velocity corresponding to the velocity of the prime-motor, the means whereby to regulate the quantity of medium from the power-generating mechanism to the power-transmission-motor, may be operated whereby to cause a variable quantity of the medium to be imparted to the power transmission-motor, thereby causing the power-transmission-motor to operate at variable velocities, irrespective of the constant velocity of the prime-motor, and the power-generating mechanism; the impulses of the power-generating mechanism, and the impulses of the prime-motor will be accumulated according to the quantity of medium furnished to the power-transmission-motor, whereupon, as will be observed, if it is desired to overcome a temporary resistance, the imparting of a minimum amount of medium to the power-transmission mechanism will give the maximum amount of leverage through the concentration of the impulses of the prime-motor upon one or more elements of the power-generating-mechanism. As an example therefore, in this connection, let it be assumed that vehicle is climbing a steep grade, and that the resistance is substantially maximum. If the full force or quantity of the medium is being imparted to the power transmitting-mechanism, the velocity of the prime-motor is gradually decreased, but on reducing the quantity of the medium to the power-transmitting-mechanism the velocity of the prime-motor will again be increased, whereupon the impulses of the prime motor will be concentrated, thereby adding a maximum amount of leverage of the prime motor to the quantity of the medium being imparted to the power-transmission-motor, and therefore, such leverage, will eventually be instrumental in overcoming any temporary load within the capacity of the prime motor to which the power transmission-motor may be subjected. If in climbing such grade the vehicle offers such a resistance as would normally bring the power-transmission-motor to a stop, the peculiar construction embodied in this invention permits the concentration of the power of the prime-motor, the power-generating mechanism and the elastic fluid within limits until such resistance has been overcome.

It will also be seen that the elements of the power-generating- and regulating-mechanism, and the elements of the transmission-motor are confined within a casing, which is divided into a series of inter-communicating compartments, and that the force of the medium may be directly transferred or switched from a compartment containing the power-generating-mechanism, to the compartments containing the elements of a transmission-motor without material loss of the efficiency of the force of said medium, which loss would be due to frictional resistance during the travel of the medium. By so organizing a power-transmission-motor and a power-generating-mechanism, therefore said power-generating mechanism, and said power-transmission-motor will be so intimately associated, that the medium will not be compelled to pass through lengthy or diverted avenues, but the medium, (which may be flexible) will be switched or transferred from a compartment containing a power-generating mechanism through a direct path to a working element of a power-transmission-motor, so that it may act with hydraulic force directly upon said element, (said element being so located in proximity with a power-generating mechanism as to avoid positively all unnecessary ducts, pipes or passages), it will also be noted that the force of the medium will be transferred or switched in an instantaneous manner to compartments containing some elements of a transmission-motor, by causing the medium to pass through the openings formed in the walls which separate the compartments. In this way, substantially the full force of power can be utilized, thereby gaining and maintaining a high degree of efficiency and a minimum amount of medium friction.

Should the power-transmission-motor be embodied in a form such as is illustrated and described, it will be noted that the pivotal point or the bearing of the valve member, will at all times assume the entire pressure of the medium, and the construction of this member will always be such that during the various shiftments thereof, the medium may be displaced without offering any resistance to the member. It is also to be particularly noted in connection with the power-transmission-motor, that the actuators are so arranged and the valve member so actuated, that the pressure from the medium will at all times be separated from that portion of the actuators, which during their travel offers the greatest resistance due to leverage, and in this connection it is to be noted that in no time during the operation of the members will either of them be subject to back pressure It is believed that this is the first time that this has been accomplished in motor-work.

It is one of the accomplishments gained by this invention that the power-generating mechanism may have a continuous generating function during a period while the prime-motor to which the power-generating mechanism is coupled, is caused to run, and that such power-generating mechanism is so in connection with a series of short circuiting channels that it may operate indefinitely at will whether the medium is permitted to pass to the elements of the power-transmission-motor, or whether, if so imparted, the elements of the power-transmission-motor are either retarded or stopped in their operation by resistance, or whether the medium be cut off from the power-transmission-motor by the power-regulating-means.

Figures 4, 5, 12, 13, 14:
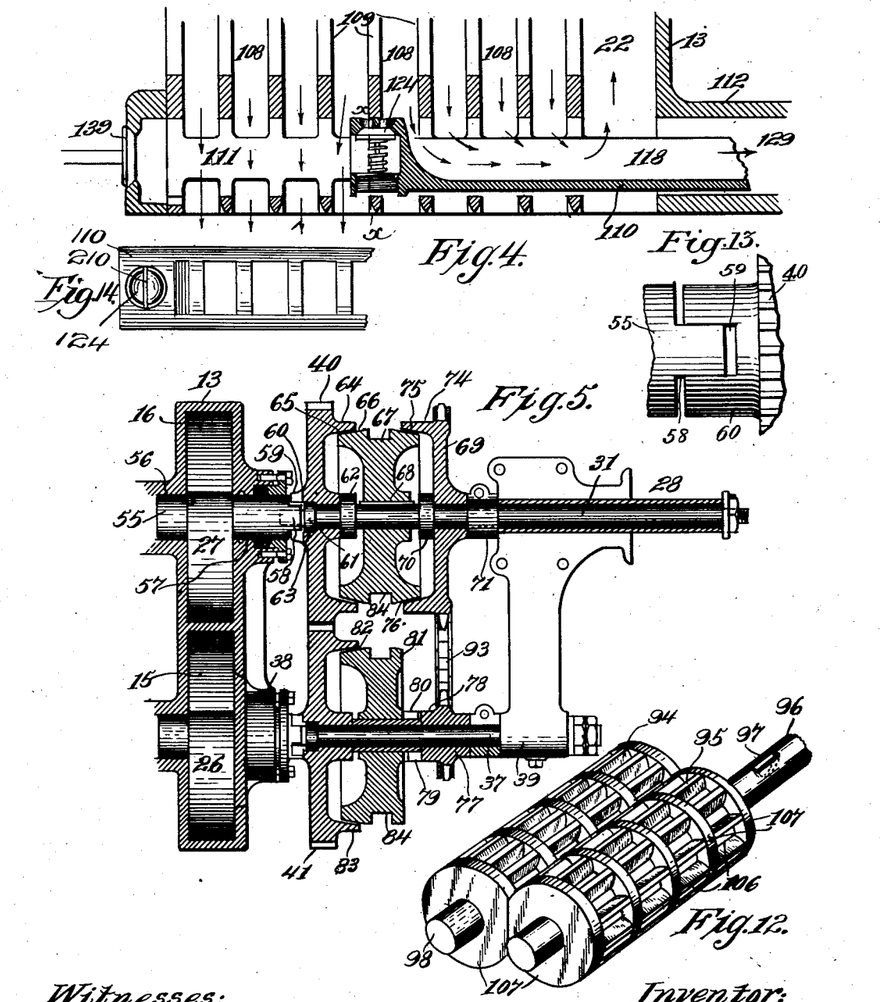
Fig. 4 illustrates a sectional view of part of the power-regulating means.
Fig. 5 illustrates an elevational view, partly in section, of a clutch mechanism.
Fig. 12 illustrates perspectively a view of elements of a power-generating mechanism.
Fig. 13 illustrates a detail view of the clutch between the shafts of the vehicle and the power transmitters.
Fig. 14 is a plan view of one end portion of the valve member.

The valve member 110 is provided with a bridge piece 210 extending transversely across the aperture at its top, as indicated in Figs. 4, 9 and 14. This bridge piece is flush with the top of the valve member and engages the walls 109 in its travel. The lower face of the bridge piece is so disposed as to engage the end of the valve 124 when seated. When the valve 110 is in a position intermediate of the parts of passages 108, as shown in Fig. 4, this bridge piece will prevent escape of the fluid from the passage shown at the left hand that is pumping to the motor into the passage at the right of the valve that is pumping into the shunt passage 22. In the absence of this bridge piece the fluid could escape from the first mentioned passage to the other one, and hence the pressure generated by the several pumping portions would be to a large extent reduced.

In the transmission chamber exclusive of the motor chamber is shown separate in Fig. 4, the chamber into which the separate outlet ports 108 from each separate generator lead, which is herein termed "the valve chamber". It will be noted that there are shown in Figs. 3 and 4 a series of eight very narrow strips or webs extending across the lower portion of this chamber. But as clearly shown in Fig. 8 these webs do not register or contact with the lower portion of the valve 110; a clear space being provided therebetween as shown in this figure. These webs do not perform any function as regards the operation of the transmission device but merely serve as a transverse support for the side walls of the structure. The operation of the valve device would be absolutely the same, were these webs omitted.

Having thus described this invention, I claim:

1. In a power-transmission-train, the combination with a prime-motor, of a power-generating mechanism, a flexible connection between said prime-motor and power-generating mechanism, a power-transmission-motor, and a casing for the transmission and power-generating-motor, said power-transmission mechanism comprising piston members in two compartments of said casing, a pivoted valve actuated by said pistons and said power generating mechanism comprising pumping portions operating in other compartments of the casing.

2. In a power-transmission-train, the combination with a prime-motor, of a power-generating mechanism, a connection between said prime-motor and power-generating mechanism, a power-transmission motor, and a casing for said transmission and power-generating motor, said power-transmitting motor comprehending movable elements operable in compartments of the casing, one of said elements being balanced and in contact with others, and effectual for controlling the flow of the medium to the compartments containing the other elements, and said generator comprising pumping portions operating in another compartment.

3. In a power-transmission train, the combination with a prime-motor of a power-generating mechanism, a flexible connection between said prime-motor and power-generating mechanism, a power-transmission motor, a casing for said transmission and power-generating motor, said power-transmission motor comprehending movable elements operable in compartments of the casing, one of said elements being balanced and in contact with others and effectual for controlling the flow of the medium to the compartments containing the other elements as it comes from the power-generating mechanism and said generator comprising a series of pumping portions in another compartment.

4. In a power-transmission-train, the combination with a prime-motor, of a power-generating mechanism, a connection between said prime-motor and power-generating mechanism, a power-transmission-motor, and a casing for said transmission-motor and power-generating-motor, said power-transmission mechanism comprising rotatably-mounted members in two compartments of said casing, and a pivoted member actuated by said rotatably-mounted members.

5. In a power-transmission-train, the combination with a prime-motor, of a power-generating mechanism, a connection between said prime-motor and power-generating mechanism, a power-transmission motor, and a casing for said transmission-motor and power-generating motor, said power-transmitting motor comprehending a valve and rotating pistons operable in compartments of the casing, said valve being balanced and in contact with the pistons and controlling the flow of the medium from the power-generating mechanism to the pistons.

6. In a power-transmission train, the combination with a prime-motor designed to be operated and maintained at a uniform velocity, of a power-generating mechanism, a flexible connection between said prime-motor and power-generating mechanism, a power-transmission motor, and a casing for said transmission-motor and power-generating motor, said power-transmission mechanism comprehending a valve and rotating pistons operable in compartments of the casing, said valve being balanced and in contact with the pistons and controlling the flow of the medium from the power-generating mechanism to the pistons.

7. In a power-transmission train, the combination with a prime-motor, of a power-generating mechanism, a flexible connection between said prime-motor and power-generating mechanism, a power-transmission motor, and a casing for said transmission-motor and power-generating motor, said transmission-motor comprising a valve operable in one compartment, and pistons operable in other compartments of the casing, and said valve being balanced upon a bearing for controlling the flow of the medium from the generator to the pistons.

8. In a power-transmission train, the combination with a prime-motor, of a power-generating mechanism, a flexible connection between said prime-motor and power-generating mechanism, a power-transmission motor, and a casing for said transmission-motor and power-generating motor, said transmission-motor comprising a valve operable in one compartment, and pistons operable in other compartments of the casing and said valve being balanced upon a bearing for controlling the flow of the medium from the generator to the pistons, and said compartments being provided with exhaust-ports leading back to the compartment containing the power-generating mechanism.

9. In a power-transmission train, the combination with a prime-motor, of a power-generating mechanism, a flexible connection between said prime-motor and power-generating mechanism, a power-transmission motor, and a casing for said transmission-motor and power-generating motor having exhaust ports, said power-transmission mechanism comprising rotatably-mounted members in two compartments of said casing, and which automatically open and close the exhaust ports, and a pivoted member actuated by said rotatably-mounted members.

10. In a power-transmission train, the combination with a prime-motor, of a power-generating mechanism, a flexible connection between said prime-motor and power-generating mechanism, a power-transmission motor, and a casing for said transmission-motor and power-generating motor having exhaust ports, said power-transmission mechanism comprising oppositely moving and rotatably-mounted members in two compartments of said casing, and which automatically open and close the exhaust ports, and a pivoted member actuated by said rotatably-mounted members.

11. In a power-transmission train, the combination with a prime-motor, of a power-generating mechanism, a connection between said prime-motor and power-generating mechanism, a power-transmission motor, and a casing for said transmission-motor and power-generating motor, said power-transmission mechanism comprising oppositely movable and rotatably-mounted members in two compartments of said casing, and a pivoted member in contact with and actuated by said rotatably-mounted members.

12. In a power-transmission train, the combination with a prime-motor, of a power generating mechanism, a flexible connection between said prime-motor and power-generating mechanism, a power-transmission-motor, and a casing for said transmission-motor and power-generating motor, said power-transmitting motor comprehending actuators operable in compartments of the casing, a balanced valve in constant contact with the actuators and controlling the flow of the medium to the compartments containing the actuators, said actuators and valve automatically controlling the exhaust.

13. In a power-transmission train, the combination with a prime-motor, of a power-generating mechanism, a flexible connection between said prime-motor and power-generating mechanism, a power-transmission motor, and a casing for said transmission-motor and power-generating motor, said power-transmission motor comprising rotatably-mounted members in two compartments of said casing and a pivoted member actuated by said rotatably-mounted members, said pivoted member having two portions in contact with said rotatably-mounted members.

14. In a power-transmission train, the combination with a prime-motor, of a power-generating mechanism, a connection between said prime-motor and power-generating mechanism, a power-transmission motor, and a casing for said transmission-motor and power-generating motor, said power-transmission motor comprising a valve and pistons operable in compartments of the casing, said valve being balanced for controlling the flow of a medium to the compartments containing the pistons.

15. In a power-transmission train, the combination with a prime-motor, of a power-generating mechanism, a connection between said prime-motor and power-generating mechanism, a power-transmission motor, and a casing for said transmission-motor and power-generating motor, said transmission-motor comprising pistons operable in compartments of the casing, and a valve in contact with said pistons and having a rocking movement relatively to the movements of said pistons and controlling the flow of a medium against the pistons.

16. In a power-transmission train, the combination with a prime-motor, of a power-generating mechanism, a connection between said prime-motor and power-generating mechanism, a power-transmission motor, and a casing for said transmission-motor and power-generating motor, said power-transmission mechanism comprehending a valve operable in a compartment of the casing and adapted for controlling the power to other compartments of said casing, pistons in said compartments and adapted to operate the valve, said pistons operating in opposite directions, a driving shaft and clutch-mechanism for imparting the two reverse movements to said shaft.

17. In a power-transmission train, the combination with a prime-motor, of a power-generating mechanism, a flexible connection between said prime-motor and power-generating mechanism, a power-transmission motor, and a casing for said power-transmission motor and power-generating motor, said power-transmission mechanism comprehending a valve operable in a compartment of the casing and adapted for controlling the power to the other compartments of said casing, pistons in said compartments and adapted to operate the valve, said pistons operating in opposite directions, a driving-shaft a second driving shaft and clutch-mechanism for imparting the two reverse movements to said shafts, and means to operate the clutch-mechanism.

18. In a power-transmission train, the combination with a prime-motor, of a power-generating mechanism, a flexible connection between said prime-motor and power-generating mechanism, a power-transmission motor, and a casing for said transmission-motor and power-generating motor, said transmission-mechanism comprehending a valve operable in a compartment of the casing, and which is constructed and arranged to operate in true balance under the medium coming from the power-generating mechanism, portions of such member contacting with the walls of the casing, pistons operating in compartments of the casing which are in communication with the power-chamber and by which the first mentioned member is actuated to intermittently control the medium from one to another of said compartments.

19. In a power-transmission train, the combination with a prime-motor, of a power-generating mechanism, a connection between said prime-motor and power-generating mechanism, a power-transmission motor, and a casing for said transmission-motor and power-generating motor, said power-transmission mechanism comprehending a valve operable in a compartment of the casing, and which is constructed and arranged to operate in true balance under the medium coming from the power-generating mechanism, portions of such member contacting with the walls of the casing, pistons operating in opposed directions in compartments of the casing which are in communication with the power-chamber, and by which the first mentioned member is actuated to intermittently control the medium from one to another of said compartments.

20. In a power-transmission train, the combination with a prime-motor, of a power-generating mechanism, a connection between said prime-motor and power-generating mechanism, a power-transmission motor, and a casing for said transmission-motor and power-generating motor, said power-transmission mechanism comprehending a valve operable in a compartment of the casing, and which is constructed and arranged to operate in true balance, under the medium coming from the power-generating mechanism, portions of such member contacting with the walls of the casing, pistons operating in opposed directions and in unison, in pairs, in compartments of the casing, which are in communication with the power-chamber and by which the first mentioned member is actuated to intermittently control the medium from one to another of said compartments.

21. In a power-transmission train, the combination with a prime-motor, of a power-generating mechanism, a connection between said prime-motor and power-generating mechanism, a power-transmission motor, and a casing for said transmission-motor and power-generating motor, the elements of said transmission-motor operating in opposite directions and in unison a driving-shaft, means to prevent the end-thrust of said shaft from affecting the operation of said members, and means to translate the relative reverse movements of such elements to the shaft.

22. In a power-transmission train, the combination with a prime-motor, of a power-generating mechanism, a connection between said prime-motor and power-generating mechanism, a power-transmission-motor, and a casing for said transmission-motor and power-generating motor, the elements of said transmission-motor operating in opposite directions and in unison, a driving-shaft, means to prevent the end-thrust of said shaft from affecting the operation of said members, and means to translate the relative reverse of movements of such elements to the shaft, and means to operate the reverse movement mechanism.

23. In a power-transmission train, the combination with a prime-motor, of a power-generating mechanism, a connection between said prime-motor and power-generating mechanism, a power-transmission motor, and a casing for said transmission motor and power-generating motor, the elements of the transmission-motor operating in opposite directions and in unison, a driving-shaft, means to prevent the end-thrust of said shaft from affecting the operation of said members, and clutch-devices to translate the relative reverse movements of such elements to the shaft, and means to operate the reverse movement mechanism.

24. In a transmission, the combination of a pressure generator, a motor operated from the generator and comprising two rotating elements having separate shafts, a power shaft mounted in alinement with one of said shafts, a gear wheel loose on the power shaft and engaged by the adjacent shaft of the motor element, a second shaft arranged in alinement with the shaft of the other motor element, a gear loose on the second shaft and engaged by the adjacent motor shaft, said latter gear being in engagement with said gear on the power shaft whereby the motor elements will rotate in unison, said gear on the power shaft having a clutch face, a clutch member keyed on the power shaft to rotate therewith, but movable axially thereon to engage the clutch member of said gear and thereby cause rotation of the power shaft from said gear, a sprocket member loose on the power shaft and provided with a clutch face arranged to be engaged by said clutch member when moved away from the clutch gear to thereby drive the power shaft from the sprocket member, the gear on the second shaft being provided with a clutch face, a clutch member loosely rotatable on the second shaft and movable axially to engage the latter clutch gear, a sprocket wheel loose on the second shaft, a chain connecting the latter sprocket wheel with the clutch sprocket member, and a connection between the clutch member on the second shaft and the sprocket on said shaft causing their simultaneous rotation in the several positions of the clutch member whereby the engagement of the clutch member with its clutch gear will operate the sprocket wheels to drive the power shaft through the said former clutch member.

25. In a transmission, the combination of a pressure generator, a motor operated from the generator, a motor shaft, a driving shaft, coöperating clutch members carried by the driving shaft, one of said members being loose on the driving shaft and driven by the motor, and means for preventing the end thrust of the clutch members from causing endwise movement of the motor shaft.

26. In a transmission, the combination of a pressure generator, a motor operated from the generator, a motor shaft, a driving shaft, coöperative clutches carried by the driving shaft and motor shaft, the motor shaft and one of the clutch members being endwise movable relatively, but caused to rotate together, whereby to prevent the end thrust of the clutch members from causing endwise movement of the motor shaft.

27. In a transmission-train, the combination with a prime-motor, of a power-generating mechanism, a connection between said power-generating mechanism and said prime-motor, a power-transmission motor, means to operate with the power-generating mechanism for storing up energy by the impulses of the prime-motor when the power-transmission motor is subjected to resistance, said power-transmission mechanism comprising rotatably-mounted members in two compartments of a casing, and a pivoted member actuated by said rotatably-mounted members.

28. In a transmission-train, the combination with a prime-motor, of a power-generating mechanism, a flexible connection between said power-generating mechanism and said prime-motor, a power-transmission motor, and means to operate with the power-generating mechanism for storing up energy by the impulses of the prime-motor when the power-transmission motor is subjected to resistance, said power-transmission motor comprehending pistons and a valve said valve being balanced and in contact with the pistons for controlling the flow of the medium to the compartments containing the pistons.

29. In a transmission-train, the combination with a prime-motor, of a power-generating mechanism, a flexible connection between said power-generating mechanism and said prime-motor, a power-transmission motor, and means to operate with the power-generating mechanism for storing up energy by the impulses of the prime-motor when the power-transmission motor is subjected to resistance, said power-transmission mechanism comprehending pistons and a valve operable in compartments of a casing, said valve being balanced and in contact with the pistons, and effectual for controlling the flow of the medium to the compartments containing the pistons as it comes from the power-generating mechanism.

30. In a transmission-train, the combination with a prime-motor, of a power-generating mechanism, a flexible connection between said power-generating mechanism and said prime-motor, a power-transmission motor, and means to operate with the power-generating mechanism for storing up energy by the impulses of the prime-motor when the power-transmission motor is subjected to resistance, said transmission-motor comprising a valve operable in one compartment, and pistons operable in other compartments of a casing, and said valve being balanced upon a bearing and effectual for controlling a flow of the medium to the pistons.

31. In a transmission-train, the combination with a prime-motor, of a power-generating mechanism, a flexible connection between said power-generating mechanism and said prime-motor, a power-transmission motor, means to operate with the power-generating mechanism for storing up energy by the impulses of the prime-motor when the power-transmission motor is subjected to resistance, said transmission-motor comprising a valve operable in one compartment, and actuators operable in other compartments of a casing, said valve being balanced upon a bearing and effectual for controlling the flow of the medium to the actuators, and said compartments being provided with exhaust-ports leading back to the compartment containing the power-generating mechanism.

32. In a transmission-train, the combination with a prime-motor, of a power-generating mechanism, a flexible connection between said power-generating mechanism and said prime-motor, a power-transmission motor, and means to operate with the power-generating mechanism for storing up energy by the impulses of the prime-motor when the power-transmission motor is subjected to resistance, said power-transmission mechanism comprising rotatably-mounted members in two compartments of a casing having exhaust ports, and which automatically open and close the exhaust ports, and a pivoted member actuated by said rotatably-mounted members.

33. In a transmission-train, the combination with a prime-motor, of a power-generating mechanism, a flexible connection between said power-generating mechanism, and said prime-motor, a power-transmission motor, and means to operate with the power-generating mechanism for storing up energy by the impulses of the prime-motor when the power-transmission motor is subjected to resistance, said power-transmission mechanism comprising oppositely moving and rotatably-mounted members in two compartments of a casing having exhaust ports, and which automatically open and close the exhaust ports, and a pivoted member actuated by said rotatably-mounted members.

34. In a transmission-train, the combination with a prime-motor, of a power-generating mechanism, a flexible connection between said power-generating mechanism and said prime-motor a power-transmission motor, and means to operate with the power-generating mechanism for storing up energy by the impulses of the prime-motor when the power-transmission motor is subjected to resistance, said power-transmission mechanism comprising oppositely moving and rotatably-mounted members and a balanced valve in contact with and actuated by said members.

35. In a transmission-train, the combination with a prime-motor, of a power-generating mechanism, a connection between said power-generating mechanism and said prime-motor, a power-transmission motor, and means to operate with the power-generating mechanism for storing up energy by the impulses of the prime-motor when the power-transmission motor is subjected to resistance, said power-transmitting motor comprehending actuators operable in compartments of a casing, a valve balanced and in constant contact with said actuators for controlling the flow of a medium to the compartments containing the actuators, said actuators and valve automatically controlling the exhaust.

36. In a transmission-train, the combination with a prime-motor, of a power-generating mechanism, a connection between said power-generating mechanism and said prime-motor, a power-transmission motor, and means to operate with the power-generating mechanism for storing up energy by the impulses of the prime-motor when the power-transmission motor is subjected to resistance, said power-transmission motor comprising rotatably-mounted members in two compartments of a casing and a pivoted member actuated by said rotatably-mounted members, said pivoted member having two portions in contact with said rotatably-mounted members.

37. In a transmission-train, the combination with a prime-motor, of a power-generating mechanism, a flexible connection between said power-generating mechanism and said prime-motor, a power-transmission motor, and means to operate with the power-generating mechanism for storing up energy by the impulses of the prime-motor when the power-transmission motor is subjected to resistance, said power-transmission motor comprising a valve and pistons operable in separate compartments of a casing, said valve being balanced for controlling the flow of a medium to the compartments containing the pistons.

38. In a transmission-train, the combination with a prime-motor, of a power-generating mechanism, a flexible connection between said power-generating mechanism and said prime-motor, a power-transmission motor, and means to operate with the power-generating mechanism for storing up energy by the impulses of the prime-motor when the power-transmission motor is subjected to resistance, said transmission-motor comprising a valve and pistons operable in separate compartments of a casing, said valve being in contact with and having a movement relatively differentiated from the movements of the pistons for controlling the flow of a medium against the pistons.

39. In a transmission-train, the combination with a prime-motor, of a power-generating mechanism, a flexible connection between said power-generating mechanism and said prime-motor, a power-transmission motor, and means to operate with the power-generating mechanism for storing up energy by the impulses of the prime-motor when the power-transmission motor is subjected to resistance, said transmission-motor comprising a valve and pistons operable in compartments of the casing, said valve being in contact with and having a rocking movement relatively to the movements of the pistons for controlling the flow of a medium against the pistons.

40. In a transmission-train, the combination with a prime-motor, of a power-generating mechanism, a flexible connection between said power-generating mechanism and said prime-motor, a power-transmission motor, and means to operate with the power-generating mechanism for storing up energy by the impulses of the prime-motor when the power-transmission mechanism is subjected to resistance, said power-transmission mechanism comprehending a valve in a compartment of a casing and adapted for controlling the power to other compartments of said casing, pistons in said compartments and adapted to operate the valve, said pistons operating in opposite directions, a driving-shaft and clutch-mechanism for imparting the two reverse movements to said shaft.

41. In a transmission-train, the combination with a prime-motor, of a power-generating mechanism, a connection between said power-generating mechanism and said prime-motor, a power-transmission motor, and means to operate with the power-generating mechanism for storing up energy by the impulses of the prime-motor when the power-transmission motor is subjected to resistance, said power-transmission mechanism comprehending a rocking valve operable in a compartment of a casing and adapted for controlling the power to other compartments of said casing, pistons in said compartments and adapted to operate the rocking valve, said pistons operating in opposite directions, a driving-shaft clutch-mechanism for imparting the two reverse movements to said shafts, and means to operate the clutch-mechanism.

42. In a transmission-train, the combination with a prime-motor, of a power-generating mechanism, a connection between said power-generating mechanism and said prime-motor, a power-transmission motor, and means to operate with the power-generating mechanism for storing up energy by the impulses of the prime-motor when the power-transmission motor is subjected to resistance, said transmission mechanism comprehending a valve operable in a compartment of the casing, and which is constructed and arranged to operate in true balance under the medium coming from the power-generating mechanism, portions of such member contacting with the walls of the casing, pistons operating in compartments of the casing which are in communication with the power-chamber, and by which the valve is actuated to intermittently control the medium from one to another of said compartments.

43. In a transmission-train, the combination with a prime-motor, of a power-generating mechanism, a flexible connection between said power-generating mechanism and said prime-motor, a power-transmission motor, and means to operate with the power-generating mechanism for storing up energy by the impulses of the prime motor when the power-transmission motor is subjected to resistance, said power-transmission mechanism comprehending a valve operable in a compartment of a casing, and which is constructed and arranged to operate in true balance under the medium coming from the power-generating mechanism, portions of such valve contacting with the walls of the casing, pistons operating in opposed directions in compartments of the casing which are in communication with the power-chamber and by which the valve is actuated to intermittently control the medium from one to another of said compartments.

44. In a transmission-train, the combination with a prime-motor, of a power-generating mechanism, a flexible connection between said power-generating mechanism and said prime-motor, a power-transmission motor, and means to operate with the power-generating mechanism for storing up energy by the impulses of the prime-motor when the power-transmission motor is subjected to resistance, said power-transmission mechanism comprehending valves operable in compartments of the casing, and which are constructed and arranged to operate in true balance under the medium coming from the power-generating mechanism, portions of such valves contacting with the walls of the casing, pistons operating in opposed directions and in unison, in pairs, in compartments of the casing which are in communication with the power-chamber and by which the valves are actuated to intermittently control the medium from one to another of said compartments.

45. In a transmission-train, the combination with a prime-motor, of a power-generating mechanism, a connection between said power-generating mechanism and said prime-motor, a power-transmission motor, and means to operate with the power-generating mechanism for storing up energy by the impulses of the prime-motor when the power-transmission motor is subjected to resistance, the elements of said transmission-motor operating in opposite directions and in unison a driving-shaft and means to prevent the end-thrust of said shaft from affecting the operation of said members, and means to translate the relative reverse movements of such elements to the shaft.

46. In a transmission-train, the combination with a prime-motor, of a power-generating mechanism, a connection between said power-generating mechanism and said prime-motor, a power-transmission motor, means to operate with the power-generating mechanism for storing up energy by the impulses of the prime-motor when the power-transmission motor is subjected to resistance, the elements of said transmission-motor operating in opposite directions and in unison a driving shaft means to prevent the end-thrust of said shaft from affecting the operation of said members, means to translate the relative reverse movements of such elements to the shaft, and means to operate the reverse movement mechanism.

47. In a transmission-train, the combination with power-transmitting motors and means to supply pressure thereto, said motors comprehending actuators operating in opposite directions and in independent paths, of translating devices operated thereby, clutch-faces carried by said translating devices, secondary translating devices adapted to be operated by the first named translating devices, clutch-faces carried thereby, a driving-shaft, secondary shaft, and clutch-devices carried by and movable upon said shafts for engagement at will with said clutch-faces.

48. In a transmission-train, the combination with power-transmitting motors and means to supply pressure thereto, said motors comprehending actuators operating in opposite directions and in independent paths, of translating - devices operated thereby, clutch-faces carried by said translating-devices, secondary translating-devices adapted to be operated by the first named translating-devices, clutch-faces carried thereby, a driving - shaft, a secondary shaft, and clutch - devices carried by and movable upon said shafts for engagement at will with said clutch - faces, and means to operate said clutch-devices.

49. In a transmission-train, the combination with power-transmitting motors and means to supply pressure thereto, said motors comprehending actuators operating in opposite directions and in independent paths, of translating - devices operated thereby, clutch-faces carried by said translating-devices, secondary translating-devices adapted to be operated by the first named translating-devices, clutch-faces carried thereby, a driving-shaft, a secondary shaft, and clutch-devices carried by and movable upon said shafts for engagement at will with said clutch-faces, levers to operate said clutch-devices, and means to operate the levers.

50. In a transmission-train, the combination with a prime-motor, of a power-transmission and power-generating mechanism, means for regulating the flow from said power-generating mechanism to said power-transmission motor, said power-generating mechanism comprehending elements which are divided into series of independent generating portions operable in independent cells, and said power-regulating mechanism being shiftable from one to another of said portions, and a check-valve carried by the regulating means.

51. In a transmission-train for vehicles, the combination with an axle, which is divided into independently operable portions, of power-transmission-motors each having independently and reversibly operable portions adapted to be connected to the independently operable portions of said axle, whereby the velocities of each portion of the axle may be varied, means to impart the reverse motion of the motors to the axles, and means to supply pressure to said motors.

52. In a transmission-train for vehicles, the combination with an axle, which is divided into independently operable portions, of power-transmission-motors each having independently and reversibly operable portions adapted to be connected to the independently operable portions of said axle, whereby the velocities of each portion of the axle may be varied, means to impart the reverse motion of the motors to the axles, and means to supply pressure to said motors, and also means to operate said means.

53. In a transmission, the combination of a series of fluid pressure generators, a fluid pressure motor, a fluid-pressure chamber for the motor, a shunt passage, the generators each having an outlet port leading into the pressure chamber and a valve member arranged to successively coöperate with each of such outlet ports to close the ports to the pressure chamber and open them aggregatively to the shunt passage when moved in one direction, and to close the ports successively to the shunt passage and open them aggregatively to the pressure chamber when moved in the opposite direction and a relief valve on the valve member.

54. In a transmission, the combination of a series of fluid pressure generators, a fluid pressure motor, a fluid pressure chamber for the motor, a shunt passage, the generators having each an outlet port leading into the pressure chamber, a valve member arranged to successively coöperate with each of the ports to close them to the pressure chamber and connect them aggregatively with the shunt passage when moved in one direction, and to successively close each port to the shunt passage and open them aggregatively to the pressure chamber when moved in the opposite direction, the valve member having a passage leading from its port engaging face to the pressure chamber and a check valve controlling said passage and retained closed when the valve head moves from registering with one port to registering position with an adjacent port.

55. In a transmission, the combination of a series of fluid pressure generators, a supply chamber connecting with such generators, a fluid pressure motor, a fluid pressure chamber for the motor, the generators having outlet ports into the pressure chamber, a return passage leading into said supply chamber, a chambered valve movable to coöperate with the outlet ports successively when advanced, the valve having its chamber open to the said return passage during said movement, the valve being arranged when moved in one direction to successively close each of the outlet ports to the pressure chamber and open the ports aggregatively to its chambered portion, and upon the valve being moved in the opposite direction to aggregatively open each of the outlet ports to said pressure chamber and close them successively to its return passage, the valve having a passage leading from its port engaging face to the pressure chamber, a check valve controlling said passage and retained closed when the valve moves from registering with one port to registering position with an adjacent port.

56. In a transmission, the combination of a series of fluid pressure generators, a fluid pressure motor, a fluid pressure chamber for the motor, a shunt passage, the generators having each an outlet port leading into the pressure chamber, a valve member arranged to successively coöperate with the ports to close them to the pressure chamber, and connect them aggregatively with the shunt passage when moved in one direction, and when moved in the opposite direction to open the ports aggregatively to the pressure chamber and close them to the shunt passage, the valve member having a passage leading from its port-engaging face to the pressure chamber, a check valve controlling said passage and retained closed when the valve head moves from registering with one port to registering position with the adjacent port, the valve head having a bridge piece extending transversely across its port at the middle portion and arranged to close the space between the check valve and the wall intermediate of adjacent outlet ports to prevent communication through said port between adjacent outlet ports.

57. In a transmission, the combination of a series of fluid pressure generators, a fluid pressure motor, a fluid pressure chamber for the motor, said generators having each an outlet port leading into the pressure chamber, said ports being disposed adjacent and in alinement, a shunt port adjacent said ports, a slide valve arranged to coöperate with said ports, the valve having a head at one end of a width to engage and cover the ports singly, the valve wall having a slot extending from said head and arranged to communicate with said outlet ports aggregatively as the valve member is advanced and to constantly register with the shunt port, and a relief valve mounted on the slide valve.

58. In a transmission, the combination of a series of fluid pressure generators, a fluid pressure motor, a fluid pressure chamber for the motor, the generators having each an outlet port leading into the pressure chamber, said ports being disposed adjacent and in alinement, a shunt port adjacent said ports, a slide valve arranged to coöperate with all said ports, the valve having a head of a width to engage and cover the ports singly, the valve wall having a slot extending from the head and arranged to communicate with said outlet ports aggregatively as the valve member is advanced and to constantly register with the shunt port, the valve head having a passage leading from the port-engaging face to the pressure chamber, and a check valve normally closing such passage and arranged to be opened by the fluid pressure when the head registers with one of the outlet ports.

59. In a transmission, the combination of a series of fluid pressure generators, a fluid pressure motor, a fluid pressure chamber for the motor, the generators having each an outlet port leading into the pressure chamber, said ports being disposed adjacent and in alinement, a shunt port adjacent said ports, a slide valve arranged to coöperate with all said ports, the valve having a head of a width to engage and cover the ports singly, the valve wall having a slot extending from the head and arranged to communicate with said outlet ports aggregatively as the valve member is advanced and to constantly register with the shunt port, the valve head having a passage leading from the port engaging face to the pressure chamber, and a check valve normally closing such passage and arranged to be opened by the fluid pressure when the head registers with one of the outlet ports, the valve head having a bridge piece extending transversely across its port at the middle portion and closing the space between the check valve and the walls intermediate of adjacent outlet ports to prevent communication through said port between adjacent ports.

60. In a transmission, the combination of a series of fluid pressure generators, a fluid pressure motor, a fluid pressure chamber for the motor, the generators having each an outlet port leading into the pressure chamber, said ports being disposed adjacent and in alinement, a shunt port adjacent said ports, a slide valve arranged to coöperate with all said ports, the valve having a head of a width to engage and cover the ports singly, the valve wall having a slot extending from the head and arranged to communicate with said outlet ports aggregatively as the valve member is advanced and to constantly register with the shunt port, the valve head having a port leading from the port engaging face to the pressure chamber, and a check valve normally closing such port and arranged to be opened by the fluid pressure when the head registers with one of the outlet ports, the valve head having a bridge piece extending transversely across its port at the middle portion and closing the space between the check valve and the walls intermediate of adjacent outlet ports, to prevent communication through said port between adjacent outlet ports, a passage connecting the outlet from the motor with the supply chamber, a passage between the latter passage and the fluid pressure chamber, and a relief valve in the latter passage.

61. The combination of a series of fluid-pressure generators, a fluid pressure motor, a fluid pressure chamber for the motor, a shunt passage, the generators having each an outlet port leading into the pressure chamber, a valve-member arranged to successively coöperate with each of the ports to close them to the pressure chamber and connect them with the shunt passage when moved in one direction, and when moved in the opposite direction to open the ports aggregatively to the pressure chamber and close them to the shunt passage, the valve member having a passage leading from its port engaging face to the pressure chamber, a check valve controlling said port and retained closed when the valve head moves from registering with one port to registering position with the adjacent port, the valve head having means arranged to prevent communication through said port between adjacent outlet ports.

62. In a transmission, the combination of a fluid pressure generating device comprising separate pressure generators arranged and operable in independent compartments of the device, a fluid pressure motor arranged to be operated from the generator, means arranged to be shifted from one of said compartments to another to regulate the flow of the fluid under pressure to the motor, and a relief valve carried by the regulating means for preventing undue pressure being generated in the compartments.

63. In a transmission, the combination of a fluid pressure generating device comprising separate pressure generators arranged and operable in independent compartments of the device, a fluid pressure motor arranged to be operated from the generator, means arranged to be shifted from one of said compartments to another to regulate the flow of the fluid under pressure to the motor, and a check valve carried by the regulating means.

64. In a transmission, the combination of a fluid pressure generating device comprising separate pressure generators arranged and operable in independent compartments of the device, a fluid pressure motor arranged to be operated from the generator, means arranged to be shifted from one of said compartments to another to regulate the flow of the fluid under pressure to the motor, a relief valve carried by the regulating means for preventing undue pressure being generated in the compartments, and means for preventing escape of fluid by back-pressure around the relief valve.

65. In a transmission, the combination of a fluid-pressure generating device comprising separate pressure generators arranged and operable in independent compartments of the device, a fluid-pressure motor arranged to be operated by the fluid from the generators, a fluid-pressure chamber for the motor, a shunt passage, the generators each having an outlet port leading into the pressure chamber and a valve member arranged to coöperate with each of such outlet ports to close the ports successively to the pressure chamber and open them aggregatively to the shunt passage when moved in one direction, and to close the ports successively to the shunt passage and open them aggregatively to the pressure chamber when moved in the opposite direction, and a relief valve carried by the regulating means for preventing undue pressure being generated in the compartments.

66. In a transmission, the combination of a generating device comprising separate pressure generators arranged and operable in independent compartments of the device, a fluid-pressure motor arranged to be operated by the fluid from the generators, a fluid-pressure chamber for the motor, a shunt passage, the compartments having each an outlet port leading into the pressure chamber, a valve member arranged to coöperate with each of the ports to successively close them to the pressure chamber and connect them aggregatively with the shunt passage when moved in one direction, and to close the ports successively with the shunt passage and open them aggregatively to the pressure chamber when moved in the opposite direction, the valve member having a passage leading from its port engaging face to the pressure chamber, and a check-valve controlling said port and retained closed when the valve head moves from registering with one port to registering position with an adjacent port.

67. In a transmission, the combination of a generating device comprising separate pressure generators arranged and operable in independent compartments of the device, a fluid-pressure motor arranged to be operated by the fluid from the generators, a fluid-pressure chamber for the motor, a shunt passage, the compartments having each an outlet port leading into the pressure chamber, a valve member arranged to coöperate with each of the ports to successively close them to the pressure chamber and connect them aggregatively with the shunt passage when moved in one direction, and to close the ports successively with the shunt passage and open them aggregatively to the pressure chamber when moved in the opposite direction, the valve member having a passage leading from its port engaging face to the pressure chamber, a check-valve controlling said port and retained closed when the valve head moves from registering with one port to registering position with an adjacent port, and means for preventing passage of the fluid between adjacent outlet ports through said valve port.

68. In a transmission, the combination of a generating device comprising separate pressure generators arranged and operable in independent compartments of the device, a fluid-pressure motor arranged to be operated by the fluid from the generators, a fluid pressure chamber for the motor, a shunt passage, the compartments having each an outlet port leading into the pressure chamber, a valve member arranged to coöperate with the ports to close them successively to the pressure chamber and connect them aggregatively with the shunt passage when moved in one direction, and when moved in the opposite direction to open the ports aggregatively to the pressure chamber and close them to the shunt passage, the valve member having a passage leading from its port-engaging face to the pressure chamber, a check-valve controlling said port and retained closed when the valve head moves from registering with one port to registering position with the adjacent port, the valve head having a bridge piece extending transversely across its port at the middle portion and arranged to close the space between the check-valve and the wall intermediate of adjacent outlet ports to prevent communication through said port between adjacent outlet ports.

Signed at Nos. 9 to 15 Murray street, New York city, N. Y., this 15th day of March, 1905.

CHARLES S. BATDORF.

Witnesses:
 FRED. W. BARNADO,
 FRED E. MAYNARD.